Patented Apr. 17, 1928.

1,666,551

UNITED STATES PATENT OFFICE.

JAMES BAYLEY BUTLER AND JAMES JOSEPH DRUMM, OF DUBLIN, IRISH FREE STATE.

PROCESS OF TREATING VEGETABLE PRODUCE.

No Drawing. Application filed October 7, 1926, Serial No. 140,209, and in Great Britain November 30, 1925.

The present invention relates to an improved process of treating vegetables which term is employed to include fruits. More specifically (but not exclusively) it relates to a process for the treatment of green vegetables. One of the main objects of the invention is to retain the natural green colour of such vegetables when they are preserved in sealed containers. Other objects are to provide improved processes of sterilization. Further objects will be apparent from the following description and the scope of the invention will be defined in the claims.

According to the invention, as a step in the preservation of vegetable produce, we prevent the development of injurious acidity by impregnating the produce with a standard buffer solution. For example, we may employ an (alkaline) solution of disodium hydrogen phosphates and in that case we may make up the solution by dissolving 4 to 8 parts by weight of disodium hydrogen phosphate, $Na_2HPO_4 12H_2O$, in 100 parts of water.

The impregnation referred to takes place after the protoplasm of the vegetable produce has been killed by scalding or otherwise. This preliminary killing renders the protoplasm permeable to the soluble alkaline buffer.

In carrying out the invention, the produce is exposed to the diffusing action of the buffer for a period of time varying with the nature of the produce, but sufficient to allow the buffer to permeate right through the substance of the vegetable produce. For the purpose of the treatment it is insufficient in most cases merely to add the buffer solution to the produce when it is being placed in the container just prior to sterilization, since an adequate period of time is necessary in order to retain the $P_H$ concentration within the produce. In cases where the surface area in relation to volume of the produce is large, a shorter period of time will suffice.

The invention will be described by way of example with reference to the treatment of peas and spinach as it is specially applicable to the treatment of vegetable produce containing chlorophyll such as peas, French beans, spinach or the like.

In the original process of canning peas or spinach, the fresh produce is first heated or boiled in water for 5 to 10 minutes and after filling into cans, the latter are hermetically sealed and then sterilized by heating to a temperature of 115°–116° C. for 10 to 30 minutes, the actual time varying in different countries. In the case of spinach, the green colour is partially lost even in the preliminary cooking or boiling, whilst in the case of peas, this colour is almost completely lost in the subsequent sterilization unless copper sulphate has been added at the beginning.

As a result of careful chemical and botanical investigations, we have discovered that this loss of colour can be prevented if the operation of sterilization (and in some cases the preliminary cooking operation) is effected under conditions of controlled hydrogen ion concentration within and without the material of the vegetable under treatment. Furthermore, such treatment eliminates the injurious effects to the natural flavour, caused by the formation of organic acids during the cooking and sterilizing. The control of the hydrogen ion concentration is effected by treating with the buffer solution prior to sterilization and in some cases by further treatment subsequent to scalding. Thus, for example, after sterilizing at a temperature of 115°–116° C. (240° F.) for 10 to 30 minutes, the hydrogen ion concentration of the liquor in the cans (on opening) is preferably between the $P_H$ values 7.0 and 7.8.

A solution of disodium hydrogen phosphate is an eminently suitable buffer for this purpose. This buffer solution is made by dissolving 40 to 80 grams of the hydrated salt ($Na_2HPO_4 12H_2O$) in 1 litre of water, i. e. 4 to 8% w/v. For blanching, 8% disodium hydrogen phosphate for 90 to 120 minutes is best. For packing liquor, e. g. for peas, a 5% concentration of this phosphate in the usual sugar salt solution or in pure water is best (through a molecular equivalent of magnesia (hydroxide) can be used at this stage if desired).

We only use magnesium hydroxide in conjunction with an alkaline buffer solution. Magnesium hydroxide by itself is not a buffer solution and it does not accomplish the same result.

A buffer solution is a solution containing a dissolved salt which has the effect of making the solution less sensitive to the addition of acid or alkali than is the case with pure water. These buffer solutions are also called solutions of reserve alkalinity, that is to say the buffer salt acts as a reservoir for storage of material from which, when the solution changes chemically, hydroxyl ions are liberated so as to prevent the alkalinity of the solution from changing so rapidly as if the buffer solution were absent. These solutions are described in a paper by Washburn, Journal of the American Chemical Society, 1908, Vol. 30, page 36.

The point may be put in another way by stating that if a small amount of acid or alkali is added to pure water, the hydrogen ion concentration changes proportionately. If a buffer salt such as sodium phosphate is present, there is a reserve alkalinity so that the hydrogen ion concentration is maintained more constant. Now for the purpose of the present invention, it it desired to keep the hydrogen ion concentration between certain limits and the presence of the buffer salt considerably reduces the liability of the solution to become either more acid or more alkaline than is prescribed, since the buffer salt exerts a compensating balancing action even if acid or alkali is added to the solution in moderate amounts.

It is best to adjust the packing liquor so that a finally sterilized tin on opening should yield a liquor of $P_H$ 7.0 to $P_H$ 7.8. Impregnation may be assisted by subjecting the produce to the action of a reduced pressure and then increasing the pressure.

Example 1.

50 kilos of spinach are boiled vigorously for 5 to 10 minutes in 150 kilos of a solution containing 6 to 7½ kilos $Na_2HPO_4 12H_2O$ together with 1.7 to 1.2 kilos of $Na.HCO_3$. In this case the boiling in the solution has itself accomplished the scalding.

At the end of this time, the spinach is taken out of the solution and pressed until its water content is 70 to 80% it is then put in 1 lb. tins; the latter sealed with lids and sterilized at a temperature of 115 to 116° C. for 35 to 45 minutes. The necessary flavourings of salt or sugar or both may be added if desired, before the tins are sealed. On opening the tins it will be found that the spinach has retained its natural green colour.

Example 2.

Peas, after scalding for 2 minutes in water at a temperature of 80 to 85° C. are allowed to steep in a 7 to 8% solution of disodium hydrogen phosphate for 80 to 120 minutes at a temperature not exceeding 45° C.

At the end of this time the peas are filled into tins containing the usual sugar-salt solution together with 2.5% of disodium hydrogen phosphate and 0.4% $NaHCO_3$. The tins are sealed and maintained at a temperature of 115–116° C. for 15–30 minutes to effect a sterilization.

Example 3.

In the above examples the object is to preserve the natural green colour as far as possible. For some markets it may be found that a less bright colour is preferred, to match the colour obtained by the housewife in domestic cooking, where the full green is not preserved. To this end, the treatment may be effected with more dilute solutions of phosphate.

Place peas in a boiler containing water at 85° C. and gradually raise to the boil; continue boiling for say 1 to 5 minutes. Pour into a colander, well wash with cold water, and transfer to a tub containing a 4% solution of disodium hydrogen phosphate at room temperature. Stir occasionally and remove after 20 minutes. (Do not wash with tap water which may contain calcium salts and might form a precipitate of calcium phosphate which would produce cloudiness). Transfer the peas to this filled with the usual solution e. g. of salt and sugar in water. (The water should be distilled water or at any rate should not contain calcium salts). A small quantity of sodium phosphate may be added if desired e. g. less than 1% but this is not essential.

The invention is not of course limited to the above examples since the quantities and nature of the substances employed may be varied departing from the scope of the invention as defined in the appended claims.

For sake of comparison, it may be added that if peas or spinach or other green vegetable are steamed in the ordinary way, the hydrogen concentration of the resulting liquor in the can is on the acid side of neutrality i. e. has a $P_H$ value less than 7.

Other alkaline buffer solutions may be used provided they are not toxic, and are capable of diffusing through the outer layer of the vegetable, and finally, provided they do not exert any undesirable subsidiary effects. Milk of lime or caustic soda are not buffer solutions and do not give the desired results. 40% of the sodium phosphate ($Na_2HPO_4 12H_2O$) can be replaced by its basic equivalent of sodium bicarbonate (i. e. 3.0% phosphate 0.45% $NaHCO_3$); if a materially larger proportion of carbonate is used, the tins become bulged, owing to the liberation of the gas carbon-dioxide.

In applying the invention to other vegetable produce, especially produce which does not contain chlorophyll it may be desirable to vary the hydrogen ion concentration somewhat, e. g. by using a mixture of disodium hydrogen phosphate and sodium-dihydrogen phosphate.

The buffer solution must be always selected so as to be nontoxic. Hence silicates, pyrophosphates, etc. would be less suitable than phosphates, or bicarbonate.

Where their use is permitted by the food laws of a country, soluble preservatives, such as benzoates, or sulphites, or essential oils, such as cloves, cassia etc., when added to the produce, accelerate the process of sterilization, thereby shortening the time of heating. This helps since proportionately lower, concentrations of buffer solutions, phosphates bicarbonates are necessary.

The above process makes it possible to obtain tins or other vessels containing sterilized (canned) peas or like produce of substantially normal colour, but containing no copper compound. This is believed to be novel in the art of canning.

We declare that what we claim is:—

1. The process of preserving vegetable produce which includes the step of impregnating the produce with a solution of disodium hydrogen phosphate of $P_H$ concentration between 7.0 and 8.3.

2. The process of preserving vegetable produce which comprises impregnating the produce with an alkaline solution containing about four to eight parts of (crystalline) disodium hydrogen phosphate in one hundred parts of water, and then sterilizing the produce by heat.

3. A sealed vessel containing sterilized vegetable produce in contact with a solution containing disodium hydrogen phosphate.

In witness whereof we have hereunto signed our names.

JAMES BAYLEY BUTLER.
JAMES JOSEPH DRUMM.